(12) United States Patent
Weber

(10) Patent No.: US 6,484,756 B1
(45) Date of Patent: Nov. 26, 2002

(54) HYDRAULIC ACCUMULATOR, ESPECIALLY A HYDRAULIC DAMPER

(75) Inventor: Norbert Weber, Sulzbach (DE)

(73) Assignee: Hydac Technology GmbH, Sulzbach/Saar (DE)

( * ) Notice: Subject to any disclaimer, the term of this patent is extended or adjusted under 35 U.S.C. 154(b) by 179 days.

(21) Appl. No.: 09/979,888

(22) PCT Filed: Jun. 7, 2000

(86) PCT No.: PCT/EP00/05223

§ 371 (c)(1),
(2), (4) Date: Nov. 27, 2001

(87) PCT Pub. No.: WO00/79135

PCT Pub. Date: Dec. 28, 2000

(30) Foreign Application Priority Data

Jun. 17, 1999 (DE) .......................................... 199 27 594

(51) Int. Cl.$^7$ ............................................... F16L 55/04
(52) U.S. Cl. ...................... 138/30; 138/31; 138/565.34; 60/413
(58) Field of Search ............................ 138/30, 31, 26; 137/565.34; 417/540; 60/413

(56) References Cited

U.S. PATENT DOCUMENTS 3,346,014 A * 10/1967 Jacuzzi .................. 137/565.34
3,718,158 A * 2/1973 Schon .................... 137/565.34
4,192,337 A * 3/1980 Alderson ........... 137/565.34 X
4,877,055 A 10/1989 Knuchel .................. 138/30 X
5,540,486 A * 7/1996 Linkner ............. 137/565.34 X

FOREIGN PATENT DOCUMENTS

DE          3235234          4/1983

* cited by examiner

Primary Examiner—Patrick Brinson
(74) Attorney, Agent, or Firm—Roylance, Abrams, Berdo & Goodman, L.L.P.

(57) ABSTRACT

A hydraulic accumulator, especially a hydraulic damper, includes a connecting piece for producing fluid communication between the interior of the hydraulic accumulator and at least two fluid connecting lines in a fitting. The connecting piece is connected to the fitting. The connecting piece is provided with at least one annular channel in its outer periphery in such a way that the connecting section of the connecting piece leading to the interior of the hydraulic accumulator is in fluid communication with the connecting line in the fitting through the annular channel. A compact construction is obtained that avoids the disadvantages of long lines.

14 Claims, 2 Drawing Sheets

HYDRAULIC ACCUMULATOR, ESPECIALLY A HYDRAULIC DAMPER

FIELD OF THE INVENTION

The present invention relates to a hydraulic accumulator, particularly a hydraulic damper, having a connecting piece providing fluid communication between the hydraulic accumulator interior and fluid connecting lines in a connection fitting. The connecting piece is connected to the connection fitting and the accumulator housing.

BACKGROUND OF THE INVENTION

Pressure fluctuations can occur in hydraulic systems, involving periodic or even singular occurrences. Cases frequently arise involving discharge flow fluctuations of rotary pumps, operation of blocking and regulating valve systems with short opening and closing cycles, and connection and disconnection of pumps, as well as sudden impact-causing connecting of fluid chambers having different pressure levels.

Hydraulic dampers are adapted to the hydraulic accumulator, and serve for the damping of such pressure fluctuations (DE 25 08 960 A1, DE 36 09 534 C1), whereby the use of membrane or diaphragm and bubble accumulators is particularly suitable. Furthermore, the hydraulic dampers according to the type of construction differ from one another in terms of pulsation dampers, suction flow stabilizers, pressure surge dampers and liquid sound insulation dampers or silencers. More detailed individual features concerning these different types of constructions are the subject of the published brochure 'Hydraulic dampers', in No. 3.701.7/7.95 of the Hydac Catalog 01, under Heading 4.

In known damping solutions using hydraulic accumulators or hydraulic dampers, as disclosed, for example, on page 14 of the above-identified Hydac Catalog, a bubble or membrane/diaphragm accumulator is connected through an adapter or connection member with two fluid connecting lines in the form of tubular lines. The tubular lines extend essentially in a plane. The connecting piece opens in the area of the tubular connecting lines at a right angle thereto, with these lines being part of a connection fitting. In this manner the fluid chamber of the accumulator, consequently the interior of the accumulator, is connected with the fluid connecting lines. When the above described pressure fluctuations are considered, the gas chamber of the accumulator is intended to quench such pressure impacts. Particularly nitrogen is to be used in this case as working gas.

DE-A-3 235 234 discloses a low cost hydraulic accumulator whose pressure vessel includes a spherical body. In the pressure vessel, a bubble support part can completely support the membrane bubble, insofar as the interior of the bubble support system remains clear of fluid. For the attachment of the hydraulic accumulator to a fluid supply, the bubble support part has on its bottom a connection piece with an axially symmetrical connecting journal. The connecting journal is provided with an exterior threading for the screwing into a corresponding attachment member. The attachment member carries the fluid supply for the hydraulic accumulator. This hydraulic accumulator, taking this into consideration, has only one fluid attachment extending in the longitudinal direction of the bubble support part, and consequently, requires a quite extensive structural space. Since this hydraulic accumulator is accessible through only one fluid attachment to its connection piece, unfavorable pressure behaviors occur in the system, which particularly is the case insofar as such an accumulator is to be used as damper, stabilizer or the like.

U.S. Pat. No. 4,877,055 discloses a throttle valve connected in a hydraulic circuit with a hydraulic accumulator such that when use of the hydraulic accumulator is not required, its fluid stored on the fluid side is provided continuously through the one leak-point-forming throttle valve to the tank side, to attain a complete relaxing of the elastic membrane in the hydraulic accumulator. Damage to the membrane is avoided in such a slackened membrane state, even long-term.

The leakage structure comes into use—throttle valve is in the cartridge—and engages over its axially symmetrical connection piece with exterior threading in a connection fitting with two fluid connections for the hydraulic circuit. In the connection piece, a throttle part is mounted with its exterior wall limiting an annular channel, and otherwise is surrounded by the interior wall of the connection piece. A connecting section of the one fluid connection can be attached to the hydraulic accumulator, and then opens in screwing-in direction of the connection piece into the aforementioned annular channel. The annular channel in turn opens through a fluid connection on the tank side into the connection piece. Even that throttle-valve arrangement is of large construction in its longitudinal design, particularly because in order to attain an effective throttle point for the fluid, such a large gap area is provided between connecting piece and throttle part, which is slackened in the direction of the annular channel. Also such arrangement, with its corresponding long fluid line extension, allows no favorable pressure behaviors in the area of the total system with hydraulic accumulator. Also, in the area of attachment and connection piece, it is of large construction.

SUMMARY OF THE INVENTION

Objects of the present invention are to provide a hydraulic accumulator, particularly a hydraulic damper, which facilitates compact installation, uses fluid connecting lines of short length, and thus, facilitates an improvement of the control of the pressure behavior in the system and improves the potential for exchange by limiting the repair cost.

The foregoing objects are basically provided by a hydraulic accumulator having a connecting piece providing fluid communication between the hydraulic accumulator interior and fluid connecting lines in a connection fitting. The connecting piece is provided on its exterior periphery with at least one annular channel. A connecting section of the connecting piece opens into the interior of the hydraulic accumulator and the annular channel, providing fluid communication between the associated fluid connecting line in the connection fitting and the accumulator interior. The connecting section opens at a right angle to the screwing-in direction of the connecting piece into the annular channel. An additional connecting section in the connecting piece provides fluid communication between the accumulator interior and the other connecting line in the screwing-in direction. The hydraulic accumulator or hydraulic damper, with its connecting piece, can be fitted directly into the connection fitting, and particularly, can be screwed together with the connecting piece in such a manner that a compact installation is attained.

On the basis of this compact arrangement, the connecting section opens at a right angle into the annular channel. Also, the connecting line lengths in the design of the connection sections are shortened within the connection fitting. Thus, harmful pressure differentials are reduced and the pressure fluctuations can be better damped. Furthermore, an installation can be mounted, for example, directly at the source of the disturbance, for example, directly on the pump which produces the pressure fluctuations. Because of the integral construction of the connecting piece and the accumulator housing being directly engaged in the connection fitting, greater security during assembly can be attained, since fewer structural parts are being used. Also, such hydraulic accumulator can, in a simple operation, be removed from the connection fitting, so that a simpler, lower cost exchange of the hydraulic accumulator is possible.

One particular difficulty for the intended block construction lies in the exterior design and the simultaneously required positive guiding in the interior through the connecting piece of the hydraulic damper. That problem is preferably solved by the connecting piece of the hydraulic damper being configured as an axially symmetrical connection journal with exterior threading.

A particularly compact construction of the arrangement is attained when, preferably, the second connecting section opens into a separate annular channel extending on the exterior periphery of the connecting piece of the hydraulic accumulator and arranged in the screwing-in direction in a different plane form the first annular channel. Furthermore, the arrangement can provide that the other fluid connection line opens transverse to the direction of screwing-in into the other annular channel carrying fluid.

With another particularly preferred embodiment of the hydraulic accumulator of the present invention, the connecting sections open as fluid lines mounted in at least one enlarged hollow space of the connecting piece. This arrangement in turn decreases the damaging delta-p in the feed and discharge lines. Preferably, the fluid connection line is configured as a connection block having standardizable fluid connection lines. In this case, a modular construction system of connection block constructions and the hydraulic damper can be manufactured at low cost.

In the case of one particularly preferred embodiment of the hydraulic accumulator of the present invention, its accumulator housing rests on the connection fitting, or maintains a certain axial distance from the connection fitting in the screwing-in direction. Between the housing and the connection fitting or between the connecting piece and the connection fitting only a jointing arrangement is arranged in the form of a sealing ring or a gasket. Since basically only one outwardly working seal is required, this arrangement simplifies and shortens the assembly outlay.

With another preferred embodiment of the hydraulic accumulator of the present invention, the connecting piece is provided with an additional jointing arrangement aligned along its exterior threading, or the connecting piece is provided at its open end with an installation cone or tapered socket. As a jointing arrangement, a plastic seal is provided solely on the exterior periphery of the exterior threading. Such arrangements are provided with a reduced jointing means or gasket insert, particularly for the situations wherein very high fluid velocities, or pulsations are in force. The screw threading, in turn, because of its considerable threading length, can be assumed as a seal arrangement for particular special uses.

A particularly low-cost and compact construction can be attained insofar as the hydraulic accumulator is embodied as a metal bellows accumulator. The bellow open end is turned toward the connecting piece. The bellows exterior periphery limits a fluid chamber with the housing. Preferably, the housing is likewise configured as the metal bellows, which is itself axially symmetrical.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
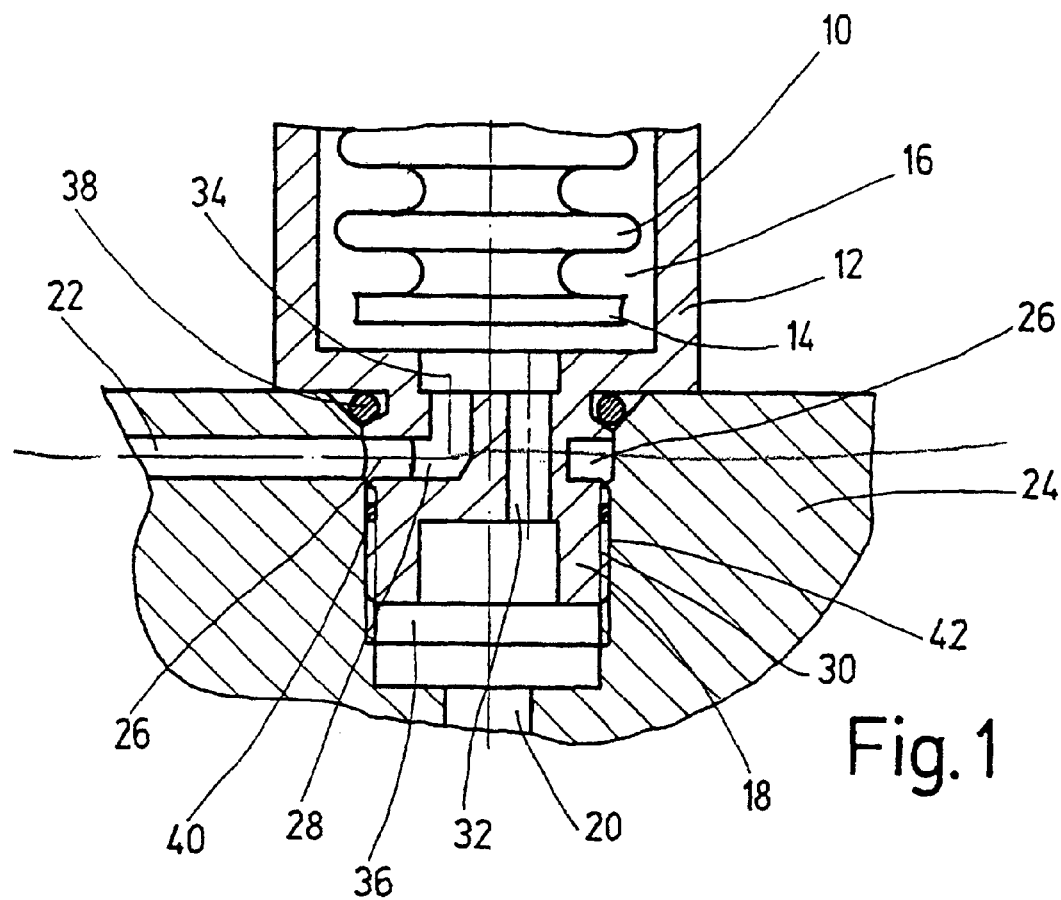
FIG. 1 is a partial side elevational view in section of a hydraulic damper configured as a metal bellows accumulator mounted with its connecting piece in a connection block according to a first embodiment of the present invention.

The hydraulic accumulator, partially represented in FIG. 1, is configured particularly as a hydraulic damper, and is provided with a metal bellows 10 intended to damp the pressure fluctuations in a hydraulic circuit. Metal bellows 10 can have a working gas, such as nitrogen, in its interior, and can be provided with a compression spring, or can be sealed off airtight from the environment. The arrangement depends upon the desired predeterminable damping behavior. Metal bellows 10, as well as the associated housing 12, are shown only partially. Metal bellows 10 has a stop plate 14 at its open end, seen at the bottom in FIG. 1. This simple representation of the metal bellows is omitted in FIGS. 2–4 with the metal bellows accumulator housing 12 being represented only partially, insofar as its display is required for understanding of the present invention. Between the exterior periphery of metal bellows 10 with its individual bellows elements and the interior of the associated housing 12 the fluid chamber 16 of the hydraulic accumulator is located.

Instead of the partially shown metal bellows 10, in particular a traditional membrane or diaphragm accumulator or an accumulator with an elastic rubber membrane or piston accumulator arrangement can be used as the hydraulic accumulator or hydraulic damper. Furthermore, the connection technology according to the present invention need not be limited to the connection of hydraulic dampers. Indeed, it can serve as a whole for the connecting of all hydraulic accumulators. Metal bellows 10, serving as a hydraulic damper, is provided with a connecting piece 18 to produce a fluid-carrying or a fluid communication connection between the interior of the hydraulic accumulator, in other words its fluid chamber 16, and at least two fluid connecting lines 20, 22, which are part of a connection fitting or block 24. In the structural situation in FIG. 1, connecting piece 18 is connected completely with connection fitting 24.

Connecting piece 18 is provided on its exterior periphery with a groove-like annular channel 26 passing all the way around. When the installation arrangement has been attained as in the drawings, with connecting section 28 of connecting piece 18 opening into the interior 16 of the hydraulic accumulator, connecting piece 18 is connected fluid-carrying (in fluid communication) through annular channel 26 with the associated fluid connecting line 22 in the connection fitting 24. Connecting piece 18 is configured as an axially-symmetrical cylindrical connecting journal with exterior threading 30. The connecting section 28 is at a right angle to the vertical screwing-in direction of connecting piece 18, and opens in annular channel 26 as soon as the complete screwing-in or the intended structural arrangement has been attained. Another connecting section 32, extends axially parallel to the screwing-in direction (longitudinal axis), and produces the connection with the other fluid connecting line 20 in the connection fitting 24. Because annular channel 26 is arranged circumferentially around connecting piece 18, a fluid-carrying (fluid communication) connection with connection fitting 24 can be produced in any desired rotary setting of the hydraulic accumulator.

Connecting sections 28 and 32 are configured as fluid connecting lines and both open in the direction of the fluid chamber into a common hollow space 34 within connecting piece 18 in the area of the transfer over to the other housing 12 of the hydraulic damper. Therefore, at the opposite end the other connecting section 32 opens into another stepped, enlarged hollow space 36. Since 36 opens in turn into fluid connecting line 20 in coaxial alignment with the screwing-in direction of hydraulic damper 10.

Connection fitting 24 is configured as a modular connection fitting or block, not completely shown, having standardizable connection fitting points (not shown). The other housing 12 in the embodiments of FIGS. 1 and 2 rests on the flat exterior of connection fitting 24, whereby housing 12 rests on the projecting area of connecting piece 18. Between housing 18 and connection fitting 24, a jointing arrangement 38 is arranged in the form of a seal, gasket or sealing ring. In addition or alternatively thereto dependent upon the extended sealing conditions, another seal, gasket or sealing ring 40 in the form of a plastic sealing ring can be provided on exterior threading 30 of connecting piece 18. Sealing ring 40 additionally supports or totally undertakes the sealing both between the pitches of the screw threads of exterior threading 30 of connecting piece 18 and on the associated interior threading 42 in connection fitting 24. A particularly good damping of pressure fluctuations can be attained insofar as these fluctuations occur through fluid connecting line 20 on fluid chamber 16 of the hydraulic damper and the volume of fluid is conveyed through fluid connecting line 22 out of connection fitting 24. The fluid conveyance can be executed continuously or with interruptions.

Figure 2:
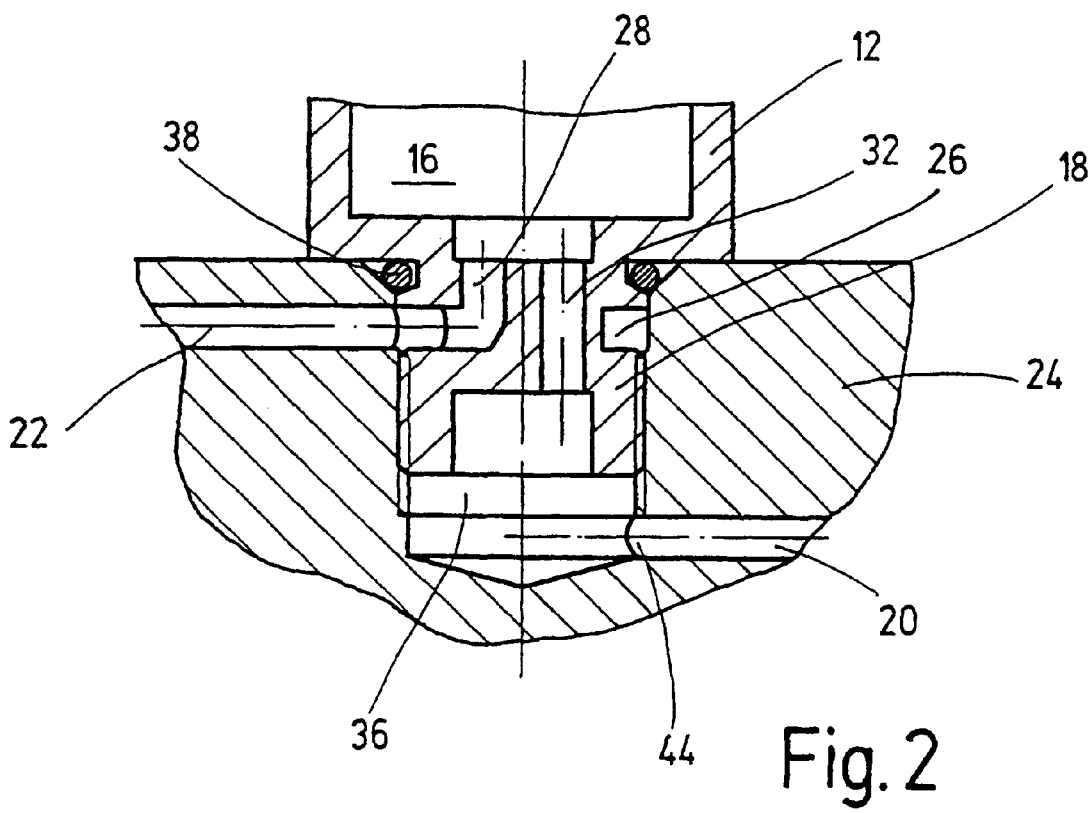
FIG. 2 is a partial side elevational view in section of a hydraulic damper configured as a metal bellows accumulator mounted with its connecting piece in a connection block according to a second embodiment of the present invention.
Figure 3:
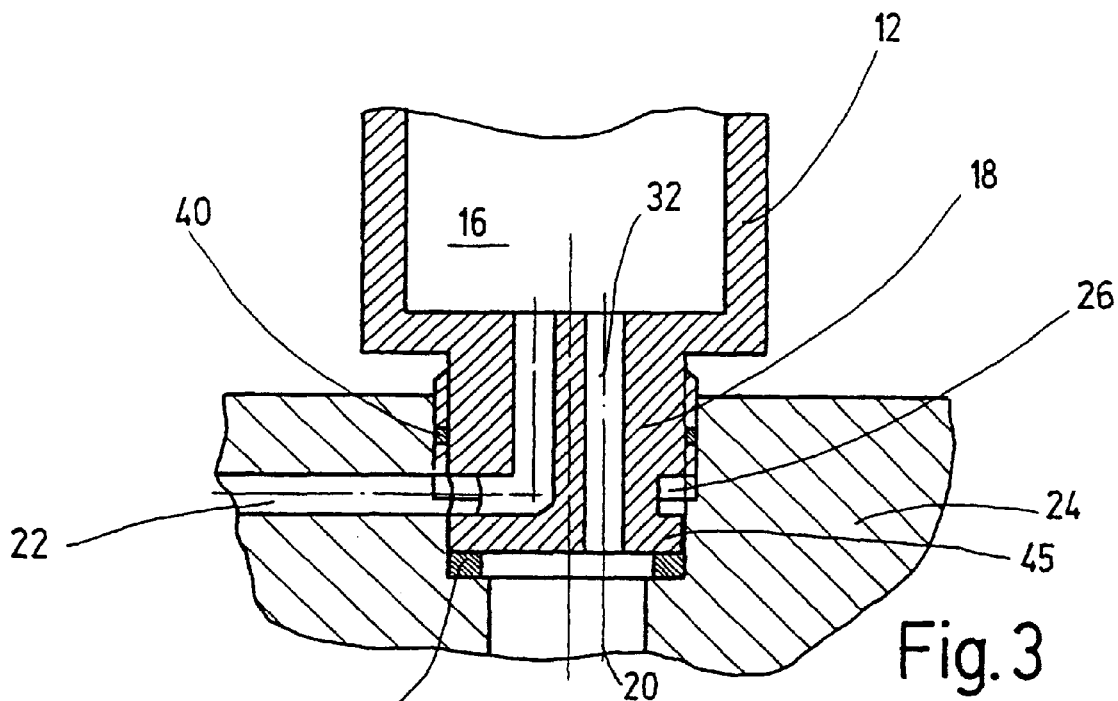
FIG. 3 is a partial side elevational view in section of a hydraulic damper configured as a metal bellows accumulator mounted with its connecting piece in a connection block according to a third embodiment of the present invention.
Figure 4:
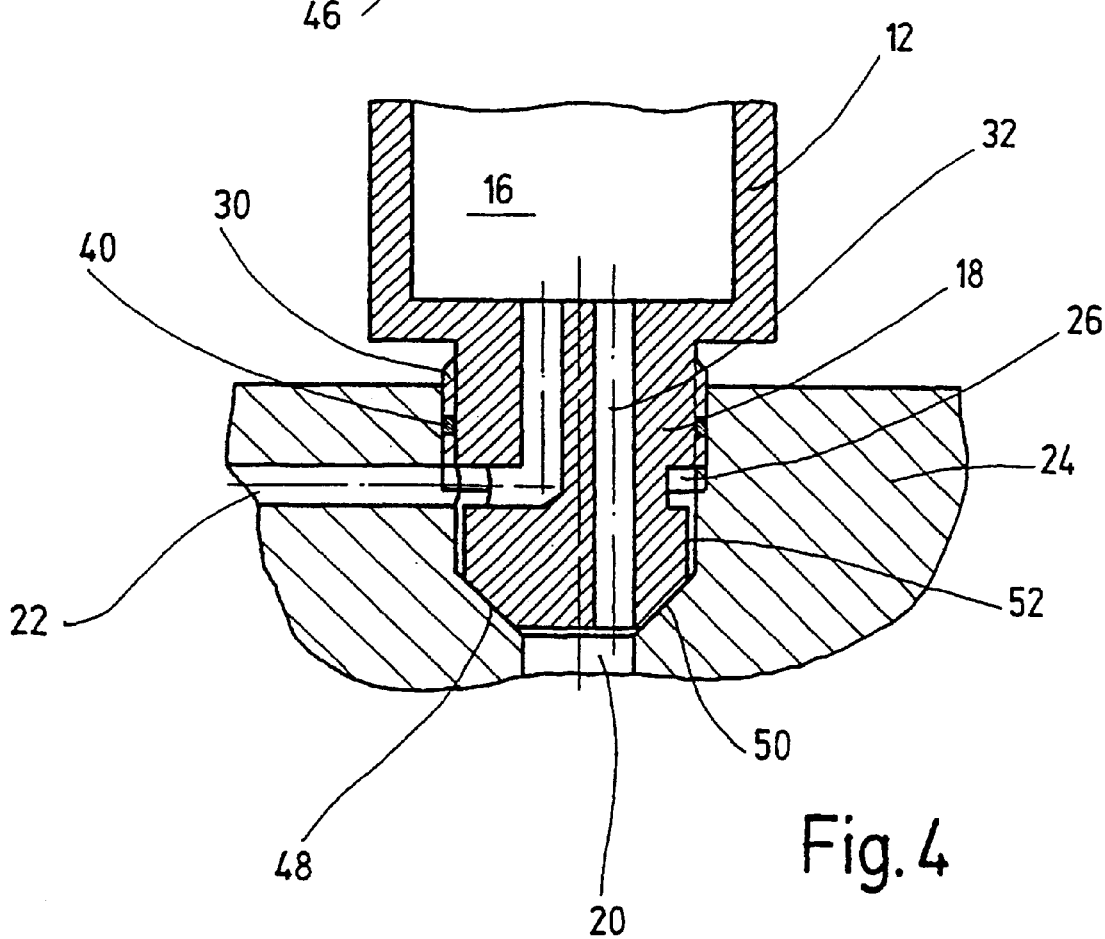
FIG. 4 is a partial side elevational view in section of a hydraulic damper configured as a metal bellows accumulator mounted with its connecting piece in a connection block according to a fourth embodiment of the present invention.

The following embodiments shown in FIGS. 2–4 are explained only insofar as they differ essentially from the embodiment of FIG. 1. Therefore, essentially the same structural parts are identified with the same reference numbers in all of the figures.

In the embodiment shown in FIG. 2, the other connecting section 32 opens into another hollow space 36 or other annular channel 44, extending through the exterior periphery of connecting piece 18. Connecting section 32 is arranged in the direction of screwing-in of the accumulator, seen in the view of FIG. 2 in a plane beneath the first annular channel 26. In this case, the other fluid connecting line 20 is arranged the same as fluid connection 22 in a plane transverse to the screwing-in direction. The two fluid connecting lines 20 and 22 in turn convey fluid and open into the associated annular channels 26 and/or 44.

In the embodiments shown in FIGS. 3 and 4, housing 12 of the hydraulic accumulator or hydraulic damper has an axial spacing between it and the flat top of the block-like connection fitting 24. In the embodiment of FIG. 3 the sealing occurs by means of a jointing arrangement 46 in the form of a sealing ring or gasket between a shoulder-like narrowing of connection fitting 24 and a flange part 45 of the otherwise essentially cylindrically configured connecting piece 18. Comparable to the embodiment of FIG. 1, the other connection section 32 in the form of a fluid. connecting line opens into the widened-out connection 20.

In the case of the embodiment as in FIG. 4, only one sealing ring or gasket 40 is provided, once again on the exterior threading 30 between connecting piece 18 and connection fitting 24. Otherwise, a sealing takes place by means of the conically-shaped part 48 on the open end of connecting piece 18. Part 48 is supported on its other end by means of a contact cone or tapered socket 50 of connection fitting 24. In the direction of the view of FIG. 4, an open sort of taphole 52, with annular channel 26 arranged over it, is provided in the opposite top area. By this means, it is possible to brace the conical areas 48 and 50 counter to one another by means of exterior threading 30 in such a manner that by this arrangement an effective sealing and a secure fluid conveyance are produced both in fluid connecting line 20 and the other connecting section 32. Comparable sealing means in the bottom area is omitted in the embodiment of FIG. 2, with the sealing being between connecting piece 18 and connection fitting 24 solely through threading area 30. As a result of this, a threaded seal is attained with a structurally very small seal member between the aforementioned fluid connections 20, 22.

With the connection fitting block for pulsation dampers, short connection line lengths are attained and a desired construction of the hydraulic system is possible. The construction is compact. Because of the small number of parts involved, considerable safety and simplicity are attained with the assembly. Furthermore, simple maintenance is guaranteed. The pulsation dampers can be exchanged rapidly for new modular parts.

While various embodiments have been chosen to illustrate the invention, it will be understood by those skilled in the art that various changes and modifications can be made therein without departing from the scope of the invention as defined in the appended claims.

What is claimed is:

1. A hydraulic accumulator, comprising:

a housing defining an interior thereof;

a connection fitting having first and second connecting lines;

a connecting piece connected with said housing and said connection fitting, said connecting piece having an exterior periphery with a first groove-like annular channel and a first connecting section opening into said interior and said first annular channel to provide fluid communication between said interior and said first connecting line, said first connecting section opening at a right angle relative to a screwing-in direction of said connecting piece into said first annular channel; and a second connecting section in said connecting piece providing fluid communication between said interior and said second connecting line in the screwing-in direction.

2. A hydraulic accumulator according to claim 1 wherein a hydraulic damper is in said housing.

3. A hydraulic accumulator according to claim 1 wherein said connecting piece is configured as an axially symmetric journal with an exterior threading.

4. A hydraulic accumulator according to claim 3 wherein said second connecting section opens into a hollow space.

5. A hydraulic accumulator according to claim 3 wherein said second connecting section opens into a second annular channel extending on said exterior periphery of said connecting piece and arranged in a different plane spaced from said first annular channel in the screwing-in direction, said second connecting line opening into said second annular channel and extending transverse to the screwing-in direction to provide fluid communication between said second connecting section and said second connecting line.

6. A hydraulic accumulator according to claim 3 wherein said first and second connecting sections are configured as fluid conduits and open into at least one enlarged hollow space within said connecting piece.

7. A hydraulic accumulator according to claim 1 wherein said connection fitting is configured as a fitting block with standardizable fluid connecting lines.

8. A hydraulic accumulator according to claim 3 wherein said housing rests on said connection fitting; and
a seal is arranged between said housing and said connection fitting.

9. A hydraulic accumulator according to claim 3 wherein said housing is axially spaced from said connection fitting in the screwing-in direction; and
a seal is arranged between said connecting piece and said connection fitting.

10. A hydraulic accumulator according to claim 8 wherein said connecting piece has a seal along said exterior threading.

11. A hydraulic accumulator according to claim 9 wherein said connecting piece comprises an open end with a conical part; and
said seal comprises a plastic sealing ring provided solely on said exterior threading.

12. A hydraulic accumulator according to claim 1 wherein a metal bellows is located in said housing and has an open end adjacent said connecting piece; and
a fluid chamber is defined between said bellows and said housing.

13. A hydraulic accumulator according to claim 12 wherein
said housing and said bellows are configured similarly axially-symmetrical.

14. A hydraulic accumulator according to claim 1 wherein said housing and said connecting piece are integral.

* * * * *